United States Patent
Sablak

(10) Patent No.: US 9,215,358 B2
(45) Date of Patent: Dec. 15, 2015

(54) OMNI-DIRECTIONAL INTELLIGENT AUTOTOUR AND SITUATIONAL AWARE DOME SURVEILLANCE CAMERA SYSTEM AND METHOD

(75) Inventor: Sezai Sablak, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 13/380,515

(22) PCT Filed: Jun. 29, 2010

(86) PCT No.: PCT/US2010/040397
§ 371 (c)(1),
(2), (4) Date: Dec. 22, 2011

(87) PCT Pub. No.: WO2011/002775
PCT Pub. Date: Jan. 6, 2011

(65) Prior Publication Data
US 2012/0098927 A1    Apr. 26, 2012

Related U.S. Application Data

(60) Provisional application No. 61/221,518, filed on Jun. 29, 2009.

(51) Int. Cl.
*H04N 7/00* (2011.01)
*H04N 5/225* (2006.01)
(Continued)

(52) U.S. Cl.
CPC .......... *H04N 5/2251* (2013.01); *G08B 13/1963* (2013.01); *G08B 13/19604* (2013.01); *G08B 13/19608* (2013.01); *H04N 7/185* (2013.01); *H04N 7/188* (2013.01)

(58) Field of Classification Search
CPC . G06F 3/04815; G06F 3/0346; G06F 3/0304; G06T 7/0042; G06T 7/0028; G06T 3/0018; H04N 5/23238; H04N 7/18; G01B 11/002; G01B 11/03; G01B 21/02; G01B 21/04; G06K 9/209; G06K 9/00791; G06K 9/00771; G03B 37/00; G02B 13/06; G08B 13/19604; G08B 13/19608; G08B 13/1963
USPC .................................. 348/143, 151, 159, 161
See application file for complete search history.

(56) References Cited

U.S. PATENT DOCUMENTS 5,872,594 A * 2/1999 Thompson ................. 348/211.6
6,611,281 B2 * 8/2003 Strubbe ...................... 348/14.01
(Continued)

FOREIGN PATENT DOCUMENTS

CN      1658670       8/2005
CN      101106700     1/2008
(Continued)

OTHER PUBLICATIONS

PCT/US2010/040397 International Search Report and Written Opinion dated Aug. 27, 2010 (14 pages).
(Continued)

*Primary Examiner* — Tat Chio
(74) *Attorney, Agent, or Firm* — Michael Best & Friedrich LLP

(57) ABSTRACT

A method of operating a video surveillance system includes providing a PTZ camera within a housing. A fisheye lens camera is attached to the housing such that the fisheye lens camera has a panoramic field of view that is unobstructed by the housing. The panoramic field of view is centered on a panning axis of the PTZ camera. The fisheye lens camera is rotated about the panning axis. A first image within the panoramic field of view is captured by using the fisheye lens camera. A location of an object of interest within the captured first image is identified. PTZ commands are transmitted to the PTZ camera such that the PTZ camera is oriented to capture a second image of the object of interest at the identified location. The PTZ commands are compensated for a rotation of the field of view of the fisheye lens camera during the rotation of the fisheye lens camera.

20 Claims, 8 Drawing Sheets

(51) Int. Cl.
*G08B 13/196* (2006.01)
*H04N 7/18* (2006.01)

(56) References Cited

U.S. PATENT DOCUMENTS

| | | | |
|---|---|---|---|
| 6,924,832 B1* | 8/2005 | Shiffer et al. | 348/36 |
| 7,382,400 B2 | 6/2008 | Sablak | |
| 2005/0134685 A1* | 6/2005 | Egnal et al. | 348/157 |
| 2006/0028550 A1* | 2/2006 | Palmer et al. | 348/155 |
| 2007/0200933 A1 | 8/2007 | Watanabe et al. | |

FOREIGN PATENT DOCUMENTS

| | | |
|---|---|---|
| EP | 0710927 | 5/1996 |
| EP | 1427212 | 6/2004 |
| EP | 1566781 | 8/2005 |
| WO | 9945511 | 10/1999 |
| WO | 0124515 | 4/2001 |
| WO | 2006017402 | 2/2006 |
| WO | 2008066742 | 6/2008 |
| WO | 2008079862 | 7/2008 |
| WO | 2009066988 | 5/2009 |

OTHER PUBLICATIONS

Chinese Patent Office Action for Application No. 201080029396.2 dated May 6, 2014 (18 pages—Including English Translation).
European Patent Office Action for Application No. 10730319.0 dated Sep. 4, 2014 (7 pages).
Chinese Patent Office Action for Application No. 201080029396.2 dated Jan. 26, 2015 (19 pages—Including English Translation).

* cited by examiner

US 9,215,358 B2

OMNI-DIRECTIONAL INTELLIGENT AUTOTOUR AND SITUATIONAL AWARE DOME SURVEILLANCE CAMERA SYSTEM AND METHOD

CROSS REFERENCES TO RELATED APPLICATIONS

This application claims the benefit of U.S. Provisional Application 61/221,518 filed Jun. 29, 2009, and PCT Application US2010040397 filed Jun. 29, 2010, each of which is hereby incorporated by reference herein.

COPYRIGHT NOTICE

Portions of this application are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2009, Robert Bosch Security Systems, Inc., All Rights Reserved.

BACKGROUND OF THE INVENTION

1. Field of the Invention

The present invention relates to a video camera surveillance system, and, more particularly, to methods of image processing for a video camera surveillance system.

2. Description of the Related Art

Video surveillance systems are used to monitor public spaces, such as train stations, market places, street intersections, or the like, and public buildings, such as libraries, agencies, courtrooms, prisons, etc. Video surveillance systems are also used in the private sector, e.g. as alarm systems or for watching over individuals who require attention.

There are numerous known video surveillance systems which may be used to track a moving object such as a person or vehicle. Video surveillance systems usually include a plurality of permanently installed cameras which observe the relevant areas in the surroundings, and they include a possibility for evaluating the video sequences that were recorded using the cameras.

While the evaluation was previously carried out by monitoring personnel, automatic evaluation of the video sequences has become more common. In a typical application of automatic monitoring, in a first step, moving objects are separated from the essentially stationary background in the scene (object segmentation), they are tracked over time (object tracking), and, if relevant movement or patterns of movement take place, an alarm is triggered. One possible design of automatic monitoring of this type is described, e.g., in EP 0710927 B1 which discusses a method for the object-oriented detection of moving objects.

Such video surveillance systems may be referred to as closed circuit television (CCTV). Some such systems utilize a fixed camera having a stationary field of view (FOV). To fully cover a given surveillance site with a fixed camera system, however, it will oftentimes be necessary to use a significant number of fixed cameras.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith. The camera may pan by rotating about a vertical axis, tilt by pivoting about a horizontal axis, and zoom by enlarging or reducing its FOV. Control signals for directing the pan, tilt, zoom movements typically originate from a human operator via a joystick or from an automated video tracking system.

A problem with such a PTZ camera is that despite being able to pan and tilt in almost any direction, the camera has a limited field of view (FOV) at any given moment in time, and thus may not be able to sense all of the motion that surrounds the camera from all directions.

What is neither disclosed nor suggested by the prior art is an improved system and an improved method for sensing motion within a larger FOV and automatically tracking an object that is a source of the motion.

SUMMARY OF THE INVENTION

In one embodiment, the invention is directed to an omni-directional (e.g., 360 degree) situational aware surveillance system which may use an omni-directional video input, such as from a fisheye lens camera ("spycam"), to sense and/or track the movements of people or objects within an entire region. The system may instruct one or more dome cameras (e.g., Bosch AutoDome cameras with AutoTrack function, see EP1427212A1) to direct the PTZ motor controls to any targeted persons or objects sensed by the fisheye camera so that the autodome camera can continue to track the moving object with greater detail and/or specificity. Thus, the fisheye camera may function as an omni-directional sensor for 360° situational aware surveillance. Other types of known sensors that are most commonly used today are sonars and infrared sensors, but they are expensive, have high power consumption, and are complex.

The direction of the PTZ motor controls may be based on detected events, defined heuristics, and conversions from the world coordinates provided by the fisheye lens camera to pan, tilt and zoom values used by the dome cameras. Overall motion activity may be measured from consecutive frames using fisheye lens image registration, background subtraction, and foreground detection.

The invention may provide a novel approach to intelligent surveillance with video content analysis—the extraction and modeling of the content of a surveillance video captured with one or more omni-directional and/or auto-dome cameras. The ability to automatically extract video content of this nature may improve surveillance video delivery to security personnel, and may considerably broaden the possibilities of efficiently handling and presenting surveillance video in real-time.

Intelligent or automatic video surveillance has become a necessary tool in order to process hundreds of video channels reaching a manned security room. The system handling the data in real-time should optimally take into account the preferences of the user and filter the real-time video and buffered content accordingly.

Electronic monitoring and surveillance devices, which are typically various fixed and moving cameras, may ideally be aimed at the suspicious targets or objects when recording videos in main traffic routes, office buildings, residential communities and large department stores or supermarkets. In traditional camera systems, the objects that can be targeted are very limited because of the limited aiming range of cameras having a lens with a standard field of view. Additionally, most known video capturing devices work with all kinds of blind spots since they have a small field of view. Therefore, the way current devices are used in surveillance is far from ideal for 360° situational aware surveillance.

Typically, surveillance applications have multiple targets simultaneously presented to a human observer for analysis. However, the ability of humans to concentrate on multiple targets simultaneously is limited. Therefore, computer vision systems have been developed that can analyze information from cameras and possibly present the information in a compact symbolic fashion to the user. Information about the behavior of human targets can be extracted from characteristics of the human targets' trajectories and the interaction between the human targets.

The video analysis technology of the invention is capable of environment assessment and may drastically reduce the risks the human personnel have to take in performing dangerous tasks. The invention may provide a 360° situational aware surveillance system which uses an omni-directional video input to track the movements of people or objects within an entire region.

The fisheye lens camera may provides 360 degree total situational awareness with no blind spots. The fisheye lens camera may be suitable for both indoor and outdoor applications, and, in one embodiment, is capable of observing objects with a 300 foot radius.

In one specific embodiment of the 360 degree situational aware surveillance system, the fisheye lens spycam rotates along with the autodome camera, thereby avoiding the mechanical complexity that may be required to enable the autodome camera to rotate independently of the spycam. The spycam, which does not need to pan and tilt like the autodome camera does in order to cover a large viewing area, may cover all 360 degrees of the complete scene due to the spycam's stationary omni-directional capability. That is, although the spycam does not need to pan, and is capable of covering 360 degrees while stationary, the spycam may however be forced to pan along with the autodome for the sake of mechanical simplicity. Thus, the rotating Field of View (FOV) of the spycam may be compensated for in the image processing and in the Pan-Tilt-Zoom (PTZ) control of the PTZ autodome camera. A novel aspect of the invention may be that the spycam rotates along with the autodome camera, and compensation for the rotation of the spycam's FOV is performed in the image processing and in the control of the PTZ autodome camera. Another novel feature may be that the controller for the PTZ camera may be disposed in the autodome housing, rather than as an external personal computer (PC) that requires cables.

Yet another novel aspect may be a surveillance system using a combination of a fisheye spycam (low resolution) and autodome camera(s) (high resolution). According to the invention, a spycam may be used as an image sensor rather than for displaying purposes. For example, the spycam may merely sense a general location of a moving object, and the autodome cameras may locate the moving object with greater precision as well as produce images for display to personnel. A spycam beneath (i.e., lower than) the autodome has a very important challenge. In the present invention, while the autodome moves, the spycam beneath the autodome may also move correspondingly. In this situation, the system may need to stabilize the output of the spycam as a sensor by an omni-image registration technique in addition to some image processing such as edge detection, blurring, etc.

In a specific embodiment, the invention provides a 360 degree situational aware surveillance system which uses an omni-directional video input to create motion density map based on the movements of people or other objects within an entire region. Information about programming trajectories for a dynamic intelligent autotour feature may be extracted from maps of motion density and the interaction between the areas of high motion density. An autotour may be a trajectory or pattern of movement (e.g., panning tilting, zooming) automatically or manually programmed into the camera system so that the trajectory or pattern of movement can be repeated. It may be desirable for the trajectory or pattern to enable the camera to capture images of, or focus on, areas of high motion density.

Initially, the system may connect component areas of high movement density in a trajectory path after having developed a motion density map. The densest areas in the density map are potential areas of interest that it may be desirable for the camera to focus on. Alternatively, the system may use a heuristic approach wherein a user identifies areas of interest or the system identifies areas of interest by use of default area of interest definitions such as the largest area, smallest area, specified area thresholds, prioritized region of interest, etc. After the system selects, by user inputs or by heuristics, the areas of highest interest as connected components in a path across the motion density map, the system may calculate the center of the path line based on balancing the weights of the selected components in pixel values in the two-dimensional image. All these pixel values may thus define the trajectory of an expected intelligent autotour function. Depending on the size or area of a selected connected component, the system may provide the optimal focal length information so that monitoring may be conducted with an optimal field of view. Next, the system may convert the trajectory's pixel values to World Coordinate positions. All these values may then be converted from World Coordinate positions to PTZ values specifically calculated for each individual autodome camera. That is, all these trajectory values of the selected components are expressed in sets of PTZ values of the monitoring area of interest. Each set of PTZ values corresponds to a respective one of the autodome cameras, and may depend upon the autodome camera's geometric position in the room relative to the area to be monitored. Finally, the system calculates the smooth optimum speed at which the camera is to watch or scan across the monitored site dependent upon the length of the trajectory across the selected component.

In one embodiment, the invention comprises a method of operating a video surveillance system, including providing a PTZ camera within a housing. A fisheye lens camera is attached to the housing such that the fisheye lens camera has a panoramic field of view that is unobstructed by the housing. The panoramic field of view is centered on a panning axis of the PTZ camera. The fisheye lens camera is rotated about the panning axis. A first image within the panoramic field of view is captured by using the fisheye lens camera. A location of an object of interest within the captured first image is identified. PTZ commands are transmitted to the PTZ camera such that the PTZ camera is oriented to capture a second image of the object of interest at the identified location. The PTZ commands are compensated for a rotation of the field of view of the fisheye lens camera during the rotation of the fisheye lens camera.

The invention comprises, in another form thereof, a video surveillance system including a PTZ camera within a housing. A fisheye lens camera is attached to the housing such that the fisheye lens camera has a panoramic field of view that is unobstructed by the housing. The panoramic field of view is centered on a panning axis of the PTZ camera. The fisheye lens camera and the PTZ camera are coupled such that the fisheye lens camera follows rotation of the PTZ camera about the panning axis. The fisheye lens camera captures a first image within the panoramic field. A processing device is communicatively coupled to each of the PTZ camera and the fisheye lens camera. The processing device identifies a location of an object of interest within the captured first image, and transmits PTZ commands to the PTZ camera such that the PTZ camera is oriented to capture a second image of the object of interest at the identified location. The PTZ commands are compensated for a rotation of the field of view of the fisheye lens camera during the rotation of the fisheye lens camera.

An advantage of the present invention is that the entire 360 degree surroundings of the camera system may be continuously monitored by the fisheye lens camera while the PTZ camera tracks individual objects identified by the fisheye lens camera.

Another advantage is that the controller of the PTZ camera may be disposed within the housing of the PTZ camera, and thus no lengthy cables are needed to connect the camera with the controller.

Yet another advantage is that an autotour of the PTZ camera through areas of high movement density may be automatically programmed. Further, such autotours may be automatically planned for multiple cameras by first locating the areas of high movement density in terms of a global or spherical coordinate convention, and then translating the global coordinates to PTZ movements for each of the cameras individually.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
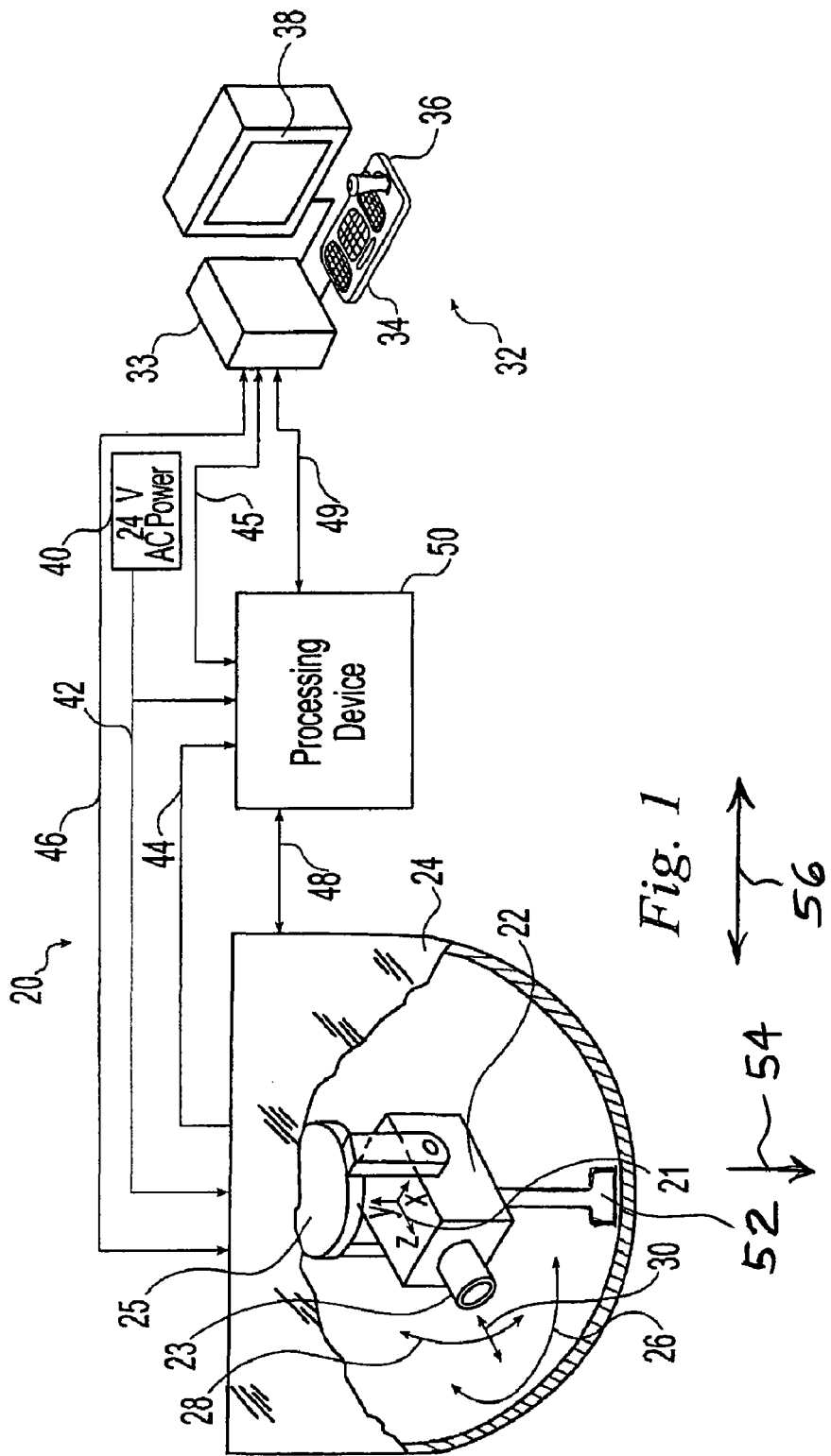
FIG. 1 is a schematic view of one embodiment of a video surveillance system in accordance with the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In accordance with one embodiment of the present invention, a video surveillance system 20 is shown in FIG. 1. System 20 includes a PTZ autodome camera 22 which is located within a partially spherical enclosure, or "autodome," 24 and mounted on support 25. Stationary support 25 may take many forms, such as an outwardly extending support arm extending from an exterior edge of a building. Enclosure 24 may be tinted to allow the camera to acquire images of the environment outside of enclosure 24 and simultaneously prevent individuals in the environment being observed by camera 22 from being able to see the orientation of camera 22. Camera 22 includes a controller and motors which provide for the panning, tilting and adjustment of the focal length of camera 22. Panning movement of camera 22 is represented by double arrow 26, tilting movement of camera 22 is represented by double arrow 28 and the changing of the focal length of the lens 23 of camera 22, i.e., zooming, is represented by double arrow 30. As shown with reference to coordinate system 21, panning motion may track movement along the x axis, tilting motion may track movement along the y-axis and focal length adjustment may be used to track movement along the z-axis. In the illustrated embodiment, camera 22 and enclosure 24 may be a Bosch AutoDome Modular Camera System, which is available from Bosch Security Systems, Inc., having a place of business in Lancaster, Pa.

System 20 also includes a head end unit 32. Head end unit 32 may include a video switcher or a video multiplexer 33. For example, the head end unit may include an Allegiant brand video switcher available from Bosch Security Systems, Inc., such as a LTC 8500 Series Allegiant Video Switcher which provides inputs for up to 64 cameras and may also be provided with eight independent keyboards and eight monitors. Head end unit 32 includes a keyboard 34 and joystick 36 for operator input. Head end unit 32 also includes a display device in the form of a monitor 38 for viewing by the operator. A 24 volt a/c power source 40 is provided to power both camera 22 and a processing device 50 that is operably coupled to both camera 22 and head end unit 32.

The illustrated system 20 is a single camera application, however, the present invention may be used within a larger surveillance system having additional cameras, some of which may be stationary, to provide coverage of a larger or more complex surveillance area. One or more VCRs or other form of analog or digital recording device may also be connected to head end unit 32 to provide for the recording of the video images captured by camera 22 and other cameras in the system.

Camera 22 may include an image-capturing device such as a charge coupled device (CCD) that acquires a four-sided (e.g., rectangular) CCD video image. Processing device 50 identifies or selects at least a portion of the CCD image to be displayed on a screen of monitor 38 for viewing by an operator of system 20.

A fisheye lens camera 52 may be provided beneath camera 22 within enclosure 24. However, it is equally possible for fisheye lens camera 52 to be disposed outside of enclosure 24. In either case, camera 52 may be mounted such that it has a hemispherical view that is unobstructed by the remainder of system 20. Camera 52 may be aimed, directed and/or facing in a downward direction 54 towards the floor or ground such that camera 52 may view a same vertical level in directions 56 throughout the entire 360 degree horizon.

Camera 52 may be used as a sensor and its captured images may be used for 360 degree situational aware surveillance in conjunction with a 360 degree situational aware surveillance algorithm. The invention offers the benefits of a simple setup, ease of operation, and a high degree of flexibility within a low cost solution that provides situational awareness without a blind spot.

Figure 2:
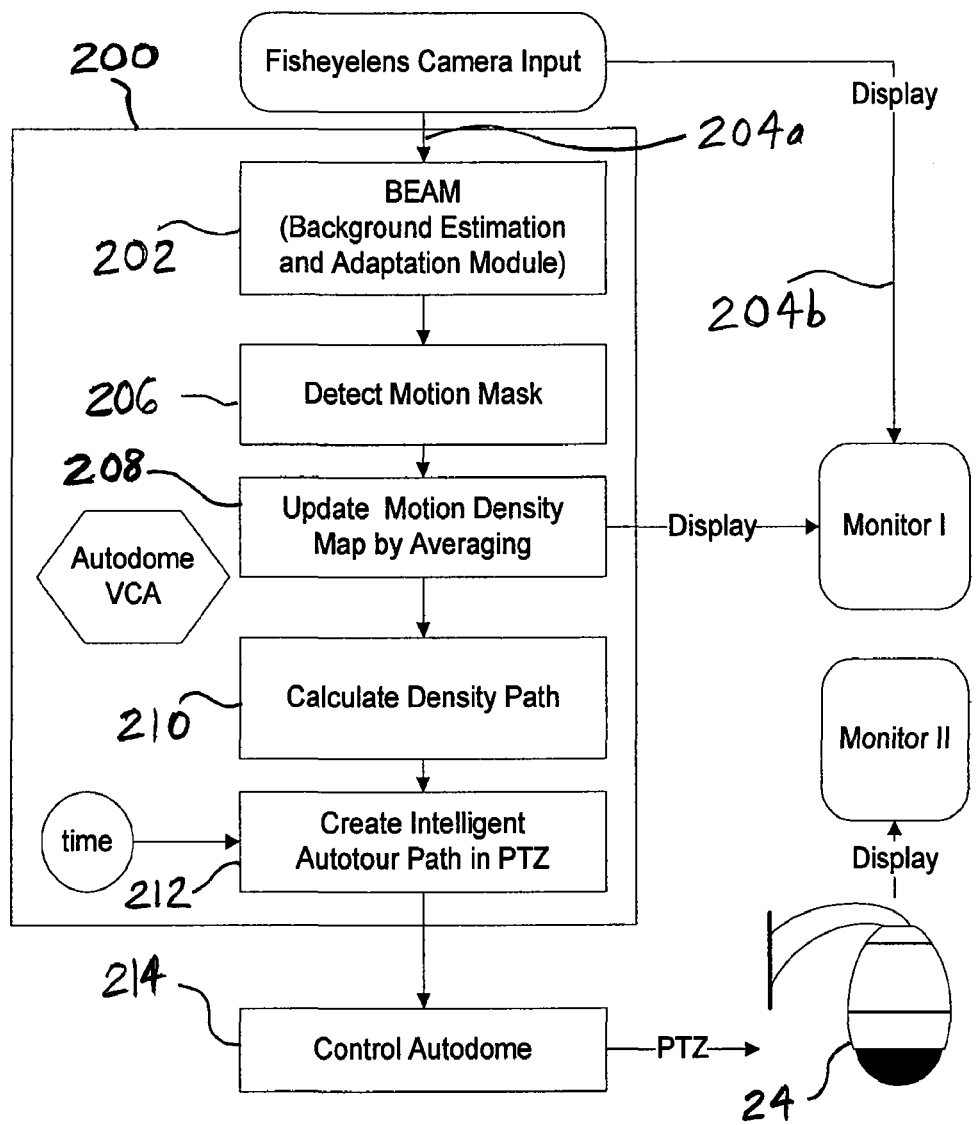
FIG. 2 is a block diagram of the video surveillance system of FIG. 1.

The sequential basics steps of the automated intelligent surveillance algorithms and the techniques that enable 360 degree situational awareness surveillance in real-time on a Video Content Analysis (VCA) hardware module (e.g., the TI DM642 DSP) are illustrated in FIG. 2. Beam 202 of Autodome VCA module 200 and Monitor I each receive a respective one of video inputs 204*a-b* from fisheye lens camera 52. The background estimation and adaptation module (BEAM) 202 may process a sequence of images and detect moving objects therein. BEAM 202 may include a background subtraction module and an interpretation layer.

In a next step 206, any motion mask that has been previously created is detected. For example, one or more motion masks may be created within a FOV wherein a permanent source of motion may be ignored by virtue of being behind or within the mask. A flag or bush that waves in the wind may be such a permanent source of motion.

In step 208, a motion density map may be updated by averaging. That is, the motion density may be calculated by an averaging function, as described in more detail below.

In a next step 210, a density path is calculated. That is, a path to be followed by the panning, tilting and/or zooming of the autodome camera such that the FOV of the camera passes through areas having a lot of motion may be calculated. This high density path may correspond to the pixels that have the densest motion in a detected motion area in x and y coordinate systems, and possibly on a line by line basis.

Next, in step 212, an intelligent autotour path is created in terms of panning, tilting and/or zooming movements. In one embodiment, a speed or transit time associated with each leg of the calculated density path is established to thereby create the autotour path. In addition, panning, tilting and/or zooming commands may further be calculated that lead the camera through the calculated density path.

In a final step 214, the autodome camera is controlled by sending the panning, tilting and/or zooming commands to autodome camera 22. The image captured by camera 22 may be displayed on Monitor II in real time.

The situational awareness may be modeled as an integrated function of two low-level video characteristics, the selection of which may be motivated by video analytics studies: (1) overall motion activity measured from consecutive frames; and (2) a 360 degree omni-directional sensor model.

The motion activity, which may be defined as a total motion in the scene including both the object and camera motion, that appears in a video stream may be considered as the first feature to be used in modeling the arousal of the situational awareness. With regard to registration of the fisheye lens image, the 360 degree omni-directional sensor model, which may be resident in the autodome head unit, may make the assumption that translation and rotation of the image in space can approximate the image motion while the autodome head unit is in motion.

A translation may be considered a pixel motion in the x or y direction by a distance defined in terms of some number of pixels. Positive translations are in the direction of an increasing row or column index; while negative translations are in the direction of a decreasing row or column index. A translation in the positive direction adds rows and/or columns to the top and/or left of the image until the required increase has been achieved. The image rotation may be performed relative to a point of origin, defined to be at the center of the motion, and thus the image rotation may be specified as an angle. The following approximation of equations may be used to represent the translation:

$$x' = (x \cos \alpha - y \sin \alpha) + t_x,$$

$$y' = (y \sin \alpha + x \cos \alpha) + t_y.$$

With regard to background subtraction, background modeling may include subtracting the current image from a reference image. The reference image may be acquired from a static background during a period of time. Extraction leaves only non-stationary or new objects. The fisheye lens camera, which does not need to pan and tilt in order to cover a large viewing area covers all 360 degrees of the complete scene because of its stationary, omni-directional capability. However, the fisheye lens camera also provides opportunities for developing strong background models.

Accordingly, the basic steps of the "background subtraction" algorithm may be as follows: Background modeling constructs a reference image and builds the background. The background estimation and adaptation module (BEAM) may be used to construct a background image.

In a second step, the thresholding method determines appropriate threshold values used in the subtraction operation to obtain a desired detection rate. For example, appropriate threshold values may enable motion of interest, such as from a person, to be detected, but motion that is not of interest, such as from a mouse, to not be detected.

A third and final step of the background subtraction algorithm may include subtraction operation or pixel classification and adaptation speed. This step classifies the type of a given pixel. For example, a pixel may be classified as a part of the background (including ordinary background and shaded background), or the pixel may be classified as a moving object.

With regard to foreground detection, a foreground region may be found by detecting when pixel intensities have probabilities above a certain global threshold. The foreground regions of each frame are grouped into connected components. A foreground extraction has a collection of regions that are different from the background by applying the connected components technique. Each foreground component may be described by a bounding box and an image mask, which indicates those pixels in the bounding box that belong to the foreground. For well-defined moving objects, the next step is to remove small components, noise and insignificant regions. To resolve more complex foreground extraction structures in the tracker, a removing algorithm may be used, such as light normalization and size filtering.

Once a foreground is detected, a size filter may be used to clean up and remove noise regions. In the case of applying the size filter per candidate regions, consider the accumulated pixel counts from the image difference. The size filter has minimum and maximum threshold values. The maximum threshold value may be used to avoid large slow-moving shadows of objects.

As mentioned above, the situational awareness may be modeled as an integrated function of two low-level video characteristics, one of which is a 360 degree omni-directional sensor model, as embodied by the fisheye lens camera 52 in one embodiment. Fisheye lens camera 52 may have a vision of 360 degree, and therefore may be capable of compacting all the information of a hemisphere into one image. Such compacting may enable images to carry much more information for computer vision applications where a very wide angle of view is needed, such as in detection, tracking and monitoring. Usually, the model parameters of the special lens required to capture a hemispherical field of view make computation of the projection transformation of the fisheye image difficult to compute accurately.

Figure 3:
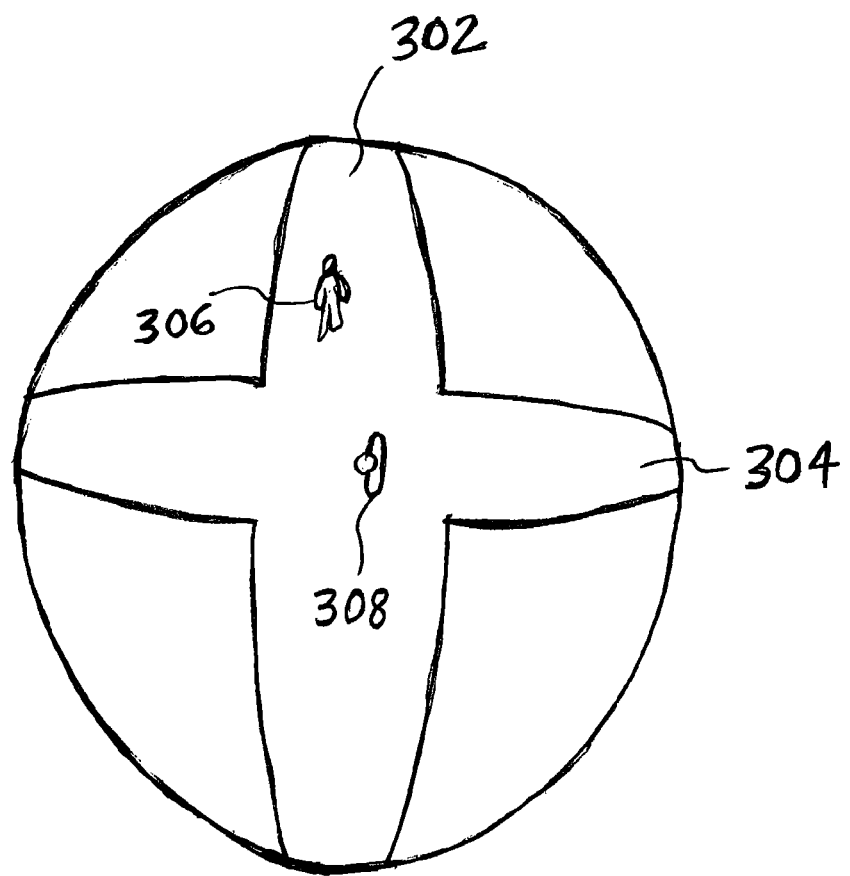
FIG. 3 is a sample of an image captured by a fisheye lens camera suitable for use in the present invention.

A sample image from a fisheye lens camera video is shown in FIG. 3. Captured in the image is the intersection of two sidewalks 302, 304, each of constant width, and oriented perpendicular to each other. The widths of the sidewalks appear to get increasingly smaller toward the outside of the image because of the increasing distance from the camera. Also shown are two human pedestrians 306, 308 walking on the sidewalks.

For conventional camera images, warping or unwarping, which require considerable processing time, may be called for in order to produce or reduce geometric distortions in images to thereby detect and display the moving object in the next frame of video. On the other hand, an unwarping technique may not be needed because the video may not be displayed to a user. Therefore, only pixel mapping may be used, by virtue of the geometry of the fisheye lens video, to control moving cameras.

The raw fisheye lens output video may not have uniform spatial resolution because of the use of the fisheye lens. Due to the optical nature of the fisheye lens, the spatial resolution of the omni-directional cameras may be greatest along the horizon. The Dinion camera systems marketed by Bosch have a resolution of 480 (H)×720 (V). When the whole hemisphere image is considered, the spatial resolution may be 4.8 pixels/degree along the horizon.

For a vision-based detection and tracking system to support a surveillance system, the detection and tracking system may need to reliably track the location and identity of objects, be able to run at reasonable speeds, be operable with multiple people, allow creation and deletion of representations of people, and be able to work with multiple cameras. To achieve all the requirements of practical tracking in real-world environments, the tradeoff between resolution and FOV may need to be accounted for. However, by virtue of the unique optimal design of the fisheye lens, there may be no need to have multiple views.

With further regard to the 360 degree omni-directional sensor model, the pixel coordinates of an object captured in an image may be converted to world coordinates (e.g., global or hemispherical coordinates, which may be expressed in terms of latitudes and longitudes with respect to a reference line of longitude, for example) in the omni-directional motion sensor model. Ideally, when measuring the angle to a target object along the horizon, its true angle can be found from the observed x and y coordinates. Then, the distance to the target from the center point may be calculated in terms of pixels along the x- and y-axes. This calculation yields the observed distance of the target in terms of pixels from the center in the fisheye image.

When unusual motion is detected, the fisheye lens camera may monitor the direction of motion activity and may provide the position of the target in the world coordinate system. An example software code which performs such calculations is as follows:

```
/************************************************************/
/*                                                          */
/* PixelToWorld( )                                          */
/* Takes 2-D image coordinates (r_img, c_img) and z-coordinate of pt */
/* in the world as input, and computes the XY coordinates (x, y).   */
/*                                                          */
/************************************************************/
void PixelToWorld(int r_img, int c_img, FLOAT *x, FLOAT *y, FLOAT z)
{
   extern INT32 r0, c0;                  // image center of omnidir. image
   extern INT32 RadiusOmni;              // radius of omnidir image
   extern FLOAT PhiOmni;                 // orientation of omnidir image
   extern FLOAT XOmni, YOmni, ZOmni;     // X, Y, Z location of omnicam in room
   extern FLOAT WidthRoom, HeightRoom;   // X, Y dimensions of the room in feet
   /* local variables */
   FLOAT r;
   FLOAT theta;
   FLOAT xs, ys;
   FLOAT xsprime, ysprime;
```

$$\text{Radians} = \left(\frac{\lambda}{180}\right) * \text{orientation}$$

```
   FLOAT PhiOmniRadians = (PI/180) * PhiOmni;
   r = √((x₁-x₀)+(y₁-y₀))
   r = sqrt(pow(r_img-r0,2) + pow(c_img-c0,2));
```

$$\theta = a\,\cos\!\left(\frac{(y_1 - y_0)}{r}\right)$$

```
   theta = acos((c_img-c0)/r);
   if (r_img > r0)
   {
      theta = -theta;
   }
   // projection
```

$$x' = \left(\frac{r*\cos(\theta)*(z_1 - z_0)}{\dfrac{(r^2 - \text{radius}^2)}{(2*\text{radius})}}\right), \quad y' = \left(\frac{r*\sin(\theta)*(z_1 - z_0)}{\dfrac{(r^2 - \text{radius}^2)}{(2*\text{radius})}}\right)$$

```
      xsprime = (r*cos(theta) * (ZOmni - z)/(( (pow(r,2)-pow(RadiusOmni,2))/(2*RadiusOmni) ))
   );
      ysprime = (r*sin(theta) * (ZOmni - z)/(( (pow(r,2)-pow(RadiusOmni,2))/(2*RadiusOmni) ))
   );
      // flip
```

```
    xsprime = -1 * xsprime;
    // rotation
xs = cos(radians) * x' - sin(radians) * y'
ys = sin(radians) * x' + sin(radians) * y'
    xs = cos(PhiOmniRadians)*xsprime - sin(PhiOmniRadians)*ysprime;
    ys = sin(PhiOmniRadians)*xsprime + cos(PhiOmniRadians)*ysprime;
// translation
    xs = xs + XOmni;
    ys = ys + YOmni;
    if (xs < 0)
        xs = 0;
    if (ys < 0)
        ys = 0;
    if (xs > WidthRoom)
        xs = WidthRoom;
    if (ys > HeightRoom)
        ys = HeightRoom;
    *x = xs;
    *y = ys;
}
```

The Autodome moving camera may use the position information expressed in World Coordinates to determine its pan, tilt and zoom values. Thus, the position information expressed in World Coordinates may be converted to PTZ position information. After the moving camera is locked on target, the moving camera may continuously track the target as long as the target is available in the scene (e.g., is within the field of view) by using velocity control functions. When the target object leaves the FOV of the camera, the camera may then hand over the tracking of the target object to another camera that has the target object in its FOV. The handover of different objects or person may be complete only when the connected component identification is invalid for a specific object. An example software code which converts from World Coordinates to PTZ position information is as follows:

```
/****************************************************************
*
*   compute_ptz_abs:
*
*   assumes x-y-z coord system where:
*       x-axis is 0 pan
*       y-axis is 90 pan
*       +z axis is 90 tilt
*       -z axis is -90 tilt
*
*   since the each physical camera might have different
*   orientation (for 0 pan, 0 tilt), the output of this
*   function needs to be rotated accordingly.
*
*   input:
*   subject[3] 3-D world coordinates of the subject
*   camera[3] 3-D world coordinates of the PTZ camera
*
*   output:
*   (pan, tilt) proper orientation for camera
*
*       0 <= pan <= 360
*       -90 <= tilt <= 90
*
*   distance -- distance from camera to subject (useful for zoom)
*
****************************************************************/
void compute_ptz_abs(FLOAT subject[ ], FLOAT camera[ ], FLOAT *pan,
FLOAT *tilt, FLOAT *distance)
{
    INT32 i;
    FLOAT diff[3]; // difference vector
    for (i=0; i<=2; i++)
    {
        diff[i] = subject[i] - camera[i];
```

```
    }
    /* distance */
    d = √((x₁-x₀)² +(y₁-y₀)² +(z₁-z₀)²)
    *distance =
        sqrt(pow(camera[0]-subject[0],2)+pow(camera[1]-subject[1],2) +
        pow(camera[2]-
subject[2],2));
    /* pan (theta) */
    *pan = atan(diff[1], diff[0]) + PI;   // in radians
    /* tilt (phi) */
    *tilt = asin(diff[2] / (*distance));  // in radians
}
```

With regard to the Graphical User Interface Module and Information Display, while it may be acceptable to run tracking algorithms directly on the fisheye lens' video, it may not be a suitable way to show the targets to end users. That is, it may be difficult for a human to recognize an object when it is displayed in fisheye lens video. Thus, the Autodome system controller may serve two basic functionalities. The first basic functionality may be to display video of an event. That is, the Autodome system controller may display the current event that is happening in the scene by using the output of moving autodome cameras. The second basic functionality may be to provide an omni-directional map window. The system may provide to the user a picture-in-picture (PIP) of a motion map for the entire region by using the fisheye lens camera output.

The invention as described above may provide 360 degree awareness with no blind spot, low cost, indoor/outdoor applications, low power consumption, low complexity, fast implementation, a coverage area within a 300 foot radius, and integration with virtual masks and privacy masks.

A fisheye lens is able to see half of the world. However, this supreme view of the world comes with a price. Namely, the image taken from an omni-directional lens is distorted. An error of as little as one pixel in measurement for the radius of one axis can increase error as the target is moved to the very top of the viewable area.

Another consideration is that the background modeling algorithm requires more CPU power for more effective background detection and higher resolution processes for more coverage area. Optimization may be needed. The algorithm runs on a small size image such as Quarter Common Intermediate Format (QCIF) with 25 frames per second. If the coverage area is to be increased, greater resolution may be called for, which also calls for more CPU power. The sensitivity may depend on the resolution. A QCIF size of 120×160 has limited sensitivity for outdoor applications.

The image from a fisheye lens may be distorted a lot at the edge of the horizon. This distortion may result in less sensitivity and accuracy for pan, tilt and zoom positions.

A final consideration is that the invention may call for camera leveling. Small inaccuracies in leveling may result in lower mapping accuracy in the pan, tilt and zoom positions.

The invention as described above addresses the problem of extracting the content of interest from a real-time video produced by a fisheye lens camera for a 360 degree situational aware surveillance system. The invention may provide an image processing method for individual target tracking in the omni-directional space of a camera using a fisheye image. The inventive method may be intelligent by virtue of computer vision algorithms and heuristics. Moreover, using an omni-directional video surveillance system with a 360 degree panoramic view eliminates blind areas. The intelligent video analytic system may instruct the Autodome to intuitively direct the PTZ motor control to any target person or object based on detected events or defined heuristics.

The present invention may provide a method for an automated 360 degree situational aware surveillance system with no blind spot to be usable with a hybrid fisheye lens and moving cameras. The present invention may also provide a method for a continuous 360 degree situational aware surveillance system to be used as an effective monitoring system. In contrast, a traditional system is inefficient or ineffective in that the user is able to watch only a very limited field of view.

The invention may provide a method for simultaneously monitoring several objects by a same camera utilizing varying and different FOVs. Thus, it is possible to quickly observe the behavior of the scene based upon omni-directional control. In contrast, a traditional system may monitor a limited number of objects using fixed cameras, which is not an efficient way to extract the behavior within the scene.

The invention may provide a method to enable the acquisition of the video output of a 360 degree FOV optical sensor for an entire region, wherein the sensor is mounted on a moving camera. The invention may also provide a method to implement a fast and reliable approach for collecting video analytics information in real-time imaging with a low resolution image.

In another embodiment of the invention, a 360 degree intelligent autotour is provided. Motion activity may be defined as a total motion in the scene over a period of time.

With regard to creating a motion mask, background modeling may include subtracting the current image from a reference image, which may be acquired from a static background during a period of time. Extraction of the background image may leave only non-stationary or new objects. The fisheye lens camera, which does not need to pan and tilt to cover a large viewing area, covers all 360 degrees of the complete scene due to the camera's stationary omni-directional capability.

Figure 4:
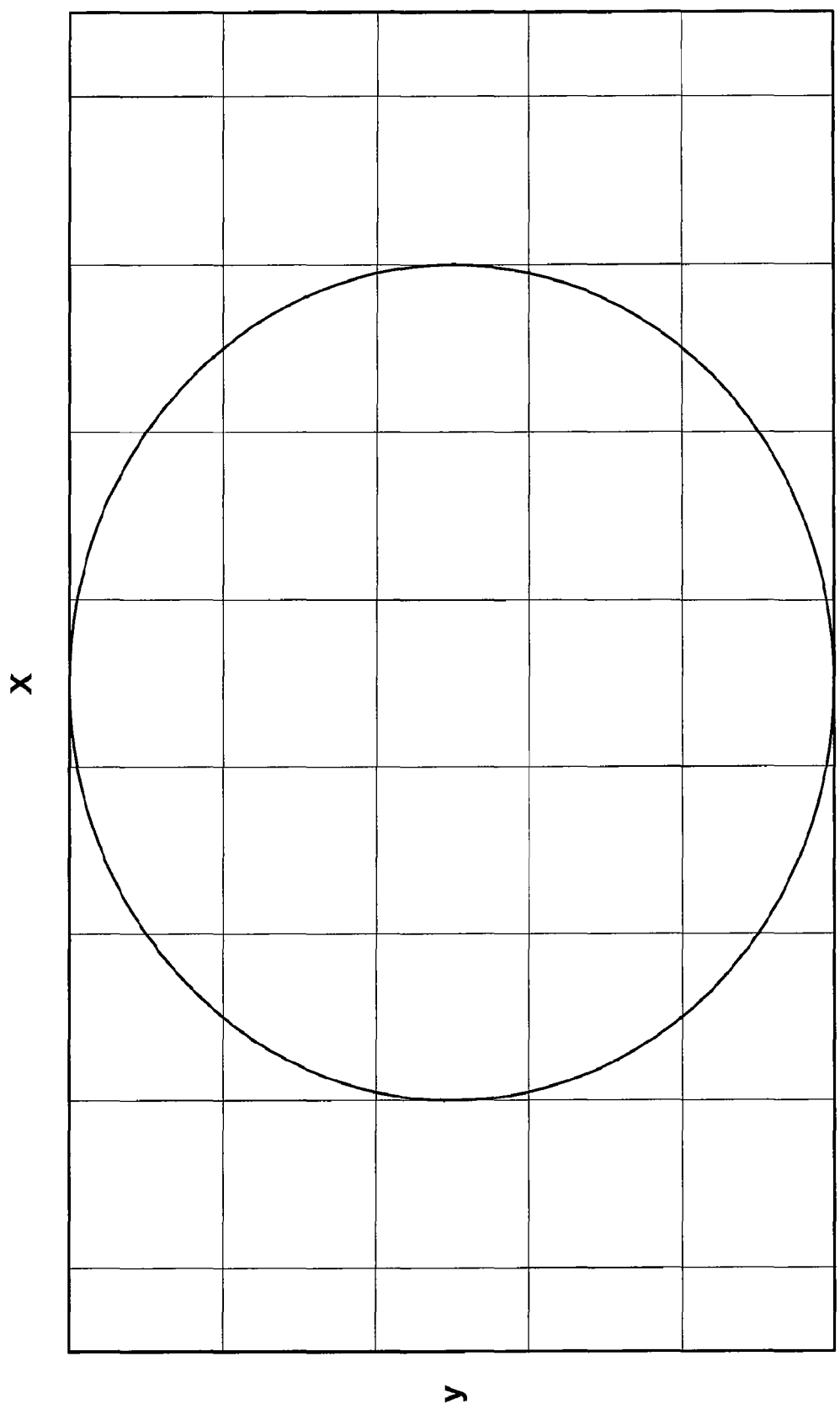
FIG. 4 is an example fisheye lens motion density map without motion.

A motion density map may be established and updated. An example fisheye lens motion density map without motion is illustrated in FIG. 4. A motion density map may be found by continuously updating motion pixels in a period of time which is defined by a user. A motion density map may have a collection of motion masks that may be detected by using background models.

A high density path may be created. The high density path may provide the pixels with the densest motion in a detected motion area in x and y coordinate systems line by line. Motion density may be calculated by an averaging function.

Figure 5:
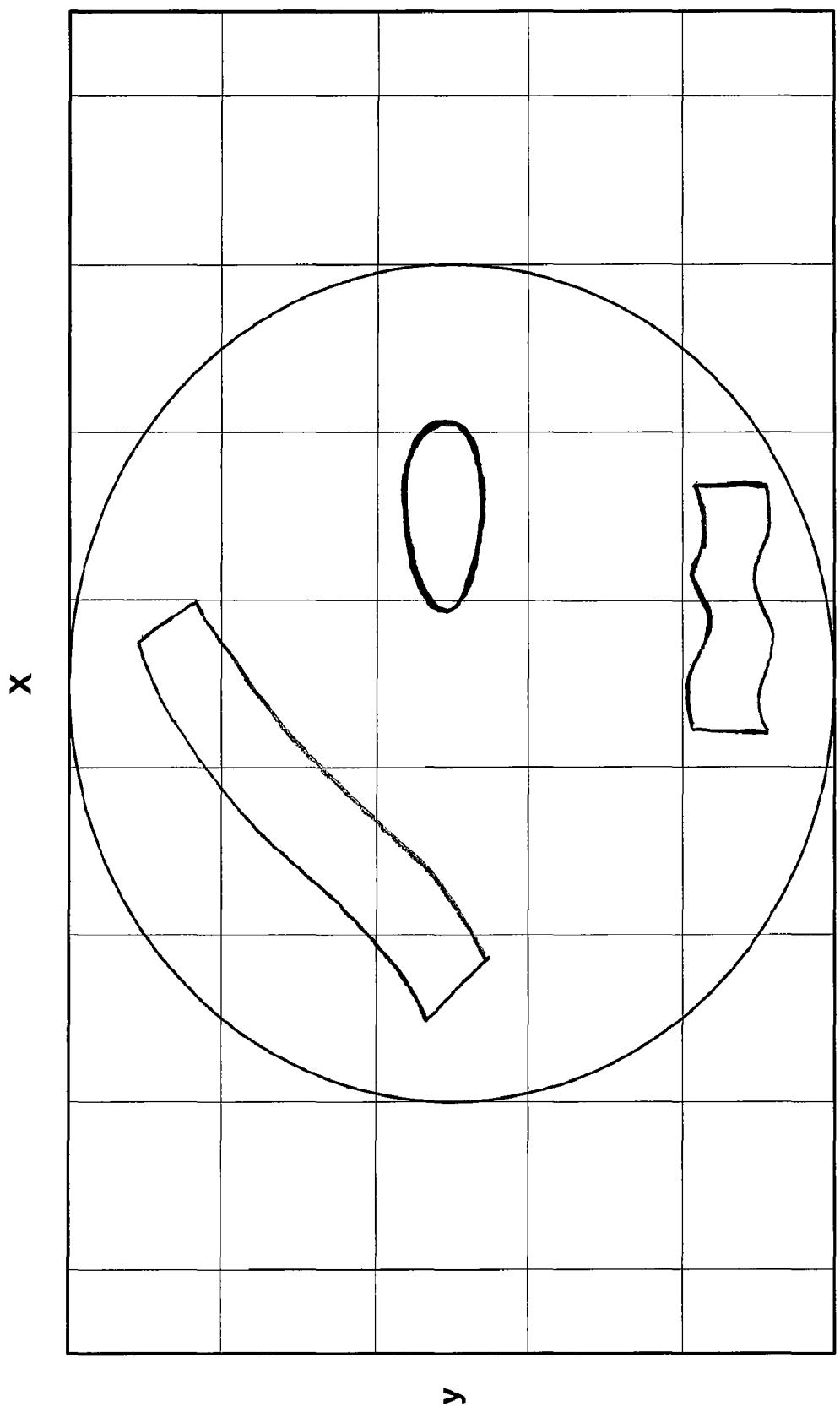
FIG. 5 is an example fisheye lens motion density map with motion during a period of time.

The following equation (1) represents motion density values per pixel for a period of time between n number of frames as represented in FIG. 5.

$$I_{average}(x, y) = \sum_{i=0}^{n} \alpha * I_i(x, y) + (1 - \alpha) * I_{average}(x, y) \quad (1)$$

Equation (1) may be embodied in code as follows:

```
/*F------------------------------------------------------------*/
/*     Name: RunningAvg                                         */
/*     Purpose: Calculating linear combination of Dst and Src:  */
/*              pDst(x,y)=alpha*pSrc(x,y)+(1-alpha)*pDst(x,y)   */
/*     Context:                                                 */
/*     Parameters:                                              */
/*         pSrc - source image                                  */
/*         pDst - destination image                             */
/*         len - length of pixel array                          */
/*         alpha - coefficient                                  */
/*F------------------------------------------------------------*/
static void RunningAvg (unsigned char* restrict pSrc,
                       float* restrict pDst, int len, float alpha)
{
    /*Some variables*/
    int i;
     float beta =1.0f -alpha;
    /*do action*/
    for ( i = 0 ; i < len; i=i+2 )
    {
        pDst[i] = (float)(beta*pDst[i]+alpha*pSrc[i]);
        pDst[i+1] = pDst[i];
    }
}
```

Figure 6:
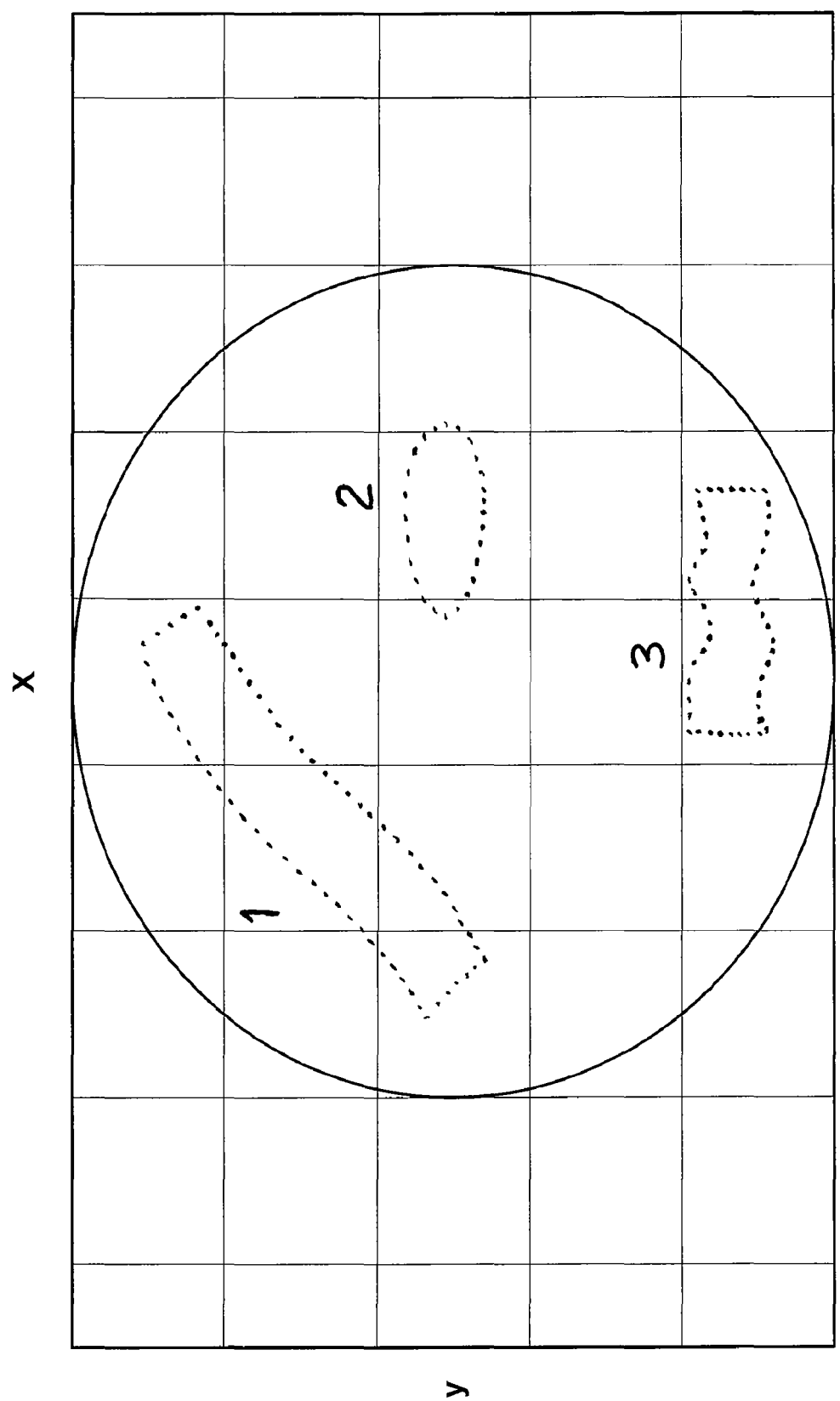
FIG. 6 is an example fisheye lens motion density map in which three components have been detected by using a connected component algorithm of the present invention.

Initially, the system may create connected components after having created a motion density map, as shown in FIG. 6. The densest areas in the density map are possible areas of interest for intelligent future considerations. However, the system might also use a heuristic approach to decide upon the definition of the area of interest, such as the largest area, smallest area, specified area thresholds, prioritized region of interest, etc. The decision about the definition of the area of interest may also be made by the user or by default.

Figure 7:
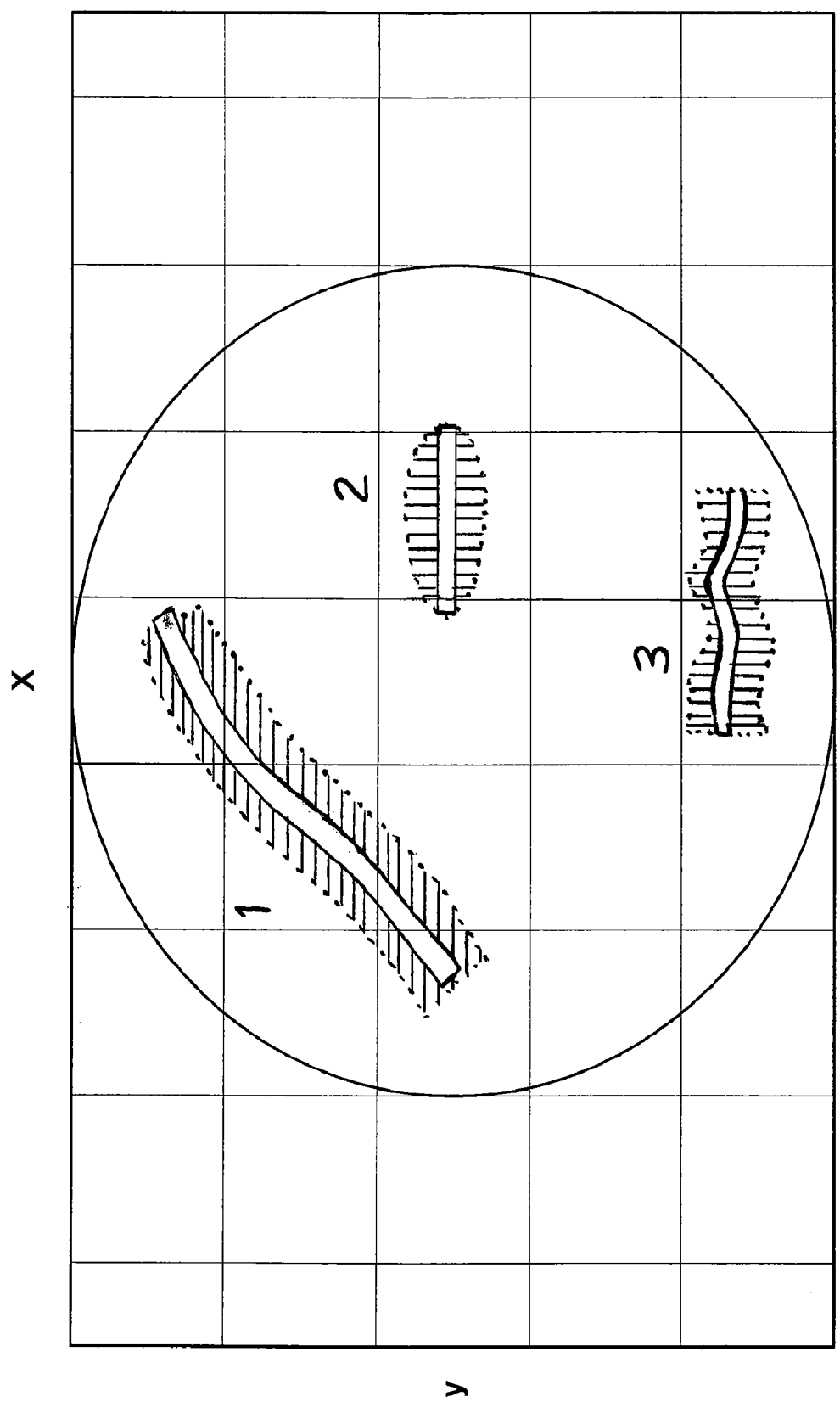
FIG. 7 is an example fisheye lens motion density map in which the intelligent autotour paths for each of the components is calculated in (x, y) pixels by using central points of lines in each connected component.

After the system has selected the area of most interest, by user input or by heuristics, for a connected component in the motion density map, the system may calculate the center of the line such that the total pixels of the selected component are evenly distributed on both sides of the line, although the line may possibly zigzag along the path. All these pixels thus define the trajectory of an expected intelligent autotour function as represented in FIG. 7.

Depending on the size of the selected connected component, the system may provide the optimum focal length information for efficient monitoring. Next, the system converts the trajectory's pixel values to World Coordinate positions. All these values are also converted from World coordinate systems to PTZ values for each individual autodome camera. The system stores all these trajectory values of selected components in PTZ values for the monitoring area for each autodome camera depending on the individual autodome's geometric position in the room. Finally the system may calculate the smooth optimum speed to perform the monitoring, wherein the speed is dependent upon the length of the trajectory of the selected component.

With regard to creating an intelligent autotour path, the system may provide the entire pan, tilt, zoom control information by dynamically using the 360 degree omni-directional sensor model for a pre-defined period of time. The invention may provide an image processing method for an intelligent autotour feature in a moving camera by using the fisheye image and utilizing computer vision algorithms and heuristics.

The invention may provide a method for an automated dynamic 360 degree intelligent autotour system to be usable with a hybrid fisheye lens camera and one or more moving (e.g., panning, tilting, and/or zooming) cameras. The present invention may provide a method for a continuous 360 degree intelligent autotour system for effective monitoring of a 360 degree panoramic scene. In contrast, a traditional system provides an inefficient or ineffective way to monitor only a small, pre-defined area.

Figure 8:
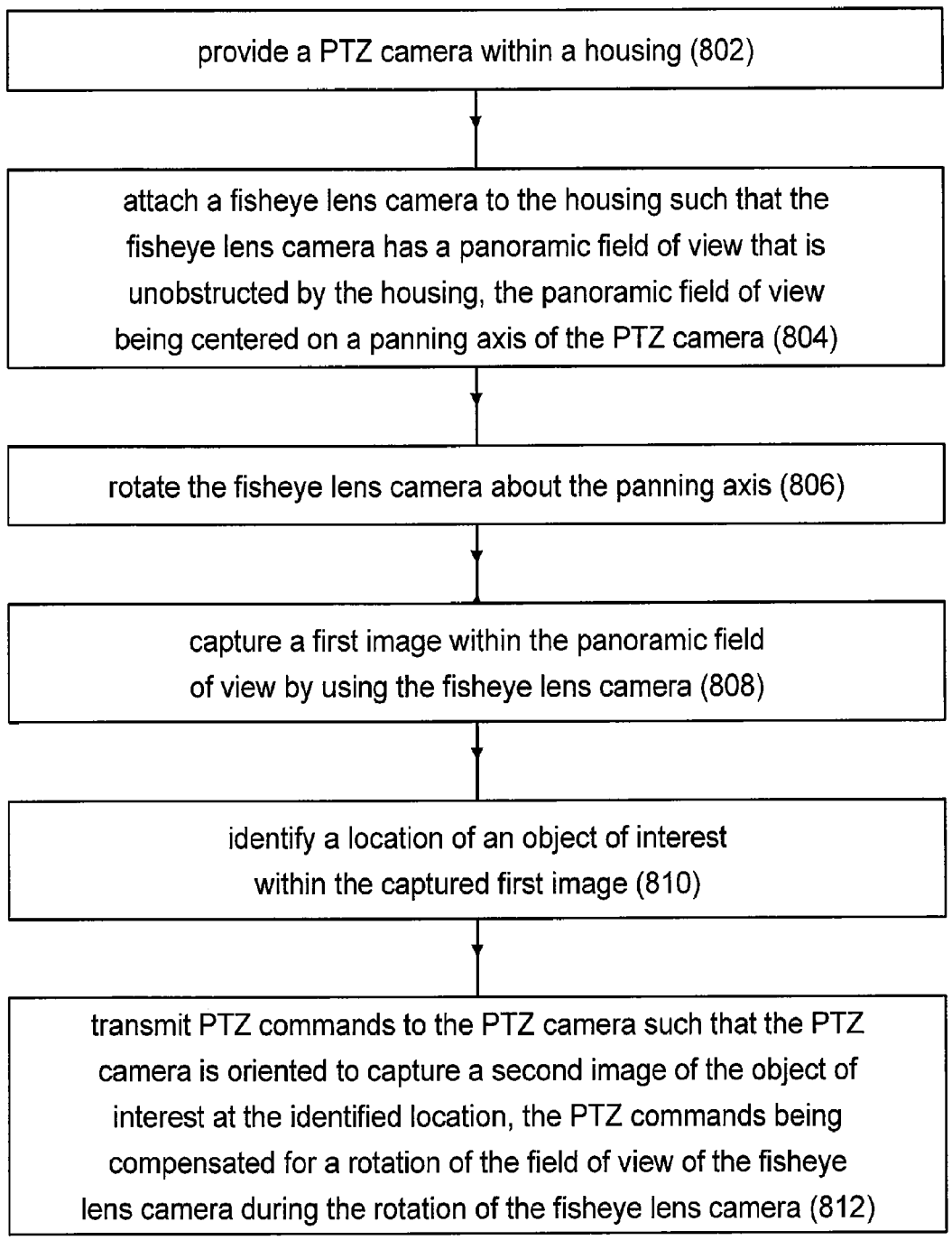
FIG. 8 is a flow chart illustrating one embodiment of a method of the present invention for operating a video surveillance system.

FIG. 8 illustrates one embodiment of a method 800 of the present invention for operating a video surveillance system. In a first step 802, a PTZ camera is provided within a housing. For example, an autodome PTZ camera 22 may be provided within an autodome or enclosure 24.

In a next step 804, a fisheye lens camera is attached to the housing such that the fisheye lens camera has a panoramic field of view that is unobstructed by the housing, the panoramic field of view being centered on a panning axis of the PTZ camera. More particularly, fisheye lens camera 52 may be attached to enclosure 24 such that camera 52 has a 180 degree, hemispherical field of view that is unobstructed by any other part of system 20. Although camera 52 is shown in FIG. 1 as being disposed within enclosure 24, enclosure 24 does not obstruct the FOV of camera 52 due to enclosure being transparent. However, it is also possible for camera 52 to extend downwardly beyond the bottom of enclosure 24. The hemispherical field of view may be centered on the y-axis shown in FIG. 1, about which PTZ camera 22 may pan. Although a fisheye lens camera may be described herein as having a hemispherical field of view spanning 180 degrees, such a fisheye lens camera may have a field of view spanning less than 180 degrees (e.g., 120 degrees) and the field of view may still be considered panoramic as the term is used herein.

Next, in step 806, the fisheye lens camera is rotated about the panning axis. For example, fisheye lens camera 52 may be mechanically fixed to PTZ camera 22 such that whenever camera 22 undergoes any panning movement about the vertical y-axis (which is the panning axis in this example), camera 52 is forced to follow the rotation about the panning axis. Camera 52 may be fixed in this manner to camera 24 for the sake of mechanical simplicity of system 20.

In step 808, a first image is captured within the panoramic field of view by using the fisheye lens camera. For example, camera 52 may continuously monitor the panoramic FOV, thus continuously capturing a sequence of image within the panoramic field of view.

In a next step 810, a location of an object of interest is identified within the captured first image. For example, an object of interest may typically be in the form of a human, and humans generally may be characterized as being in motion (e.g., having different positions from frame-to-frame), as opposed to inanimate objects which do not generally move. Thus, an area within the captured image that exhibits a high degree of motion (when considered in conjunction with immediately previous or immediately subsequent frames) may be identified as a location of an object of interest. Known moving objects within the field of view that are not of interest (e.g., a rotating ceiling fan) may be masked out so that they are not identified as an object of interest.

In a final step 812, PTZ commands are transmitted to the PTZ camera such that the PTZ camera is oriented to capture a second image of the object of interest at the identified location, the PTZ commands being compensated for a rotation of the field of view of the fisheye lens camera during the rotation of the fisheye lens camera. That is, the location of the object of interest as identified in the image captured by fisheye lens camera 52 may be communicated to a controller of PTZ camera 22 so that PTZ commands may be sent to camera 22 to thereby enable camera 22 to also capture images of the object of interest. If fisheye lens camera 52 were stationary, it would be relatively straightforward to translate the location of the object in the image captured by camera 52 into PTZ commands to aim PTZ camera 22 at the same object of interest. However, since fisheye lens camera 52 is regularly in rotational movement, the locations of objects whose image is captured by camera must be determined dependent on the rotational position of camera 52 when capturing the image, and thus must be determined dependent on the previous rotational movements of the FOV of camera 52 before capturing the image. Because the location of the object of interest is determined based on the previous rotational movements of the FOV of camera 52, the PTZ commands to cause camera 22 to pan, tilt and zoom towards the object of interest must also depend upon, and be compensated for, the previous rotational movements of the FOV of camera 52 before capturing an image of the object of interest.

In addition to the PTZ commands being compensated for the rotational movements of the FOV of fisheye lens camera 52, the processing of the images captured by camera 32 may also be dependent upon, and compensated for, a rotation of the field of view of the fisheye lens camera. For example, in determining movement of an object from frame-to-frame of the image, it must be considered that the location of the object within the image may vary from frame-to-frame due to the rotation of camera 52 between the frames. Thus, this perceived "movement" of the object that is purely due to movement of the camera may need to be cancelled out when processing the images captured by the camera in order to find moving objects therein.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating a video surveillance system, comprising steps of:

providing a PTZ camera within a housing;

securing a fisheye lens camera to the housing so that the fisheye lens camera has a panoramic field of view that is unobstructed by the housing, the panoramic field of view being centered on a panning axis of the PTZ camera, and wherein the panoramic field of view of the fisheye lens camera is coaxially aligned with the panning axis so that an essentially central point within an image from the panoramic field of view of the fisheye lens camera is in common with the panning axis of the PTZ camera;

rotating the fisheye lens camera along the panning axis while the PTZ camera is simultaneously rotating about the panning axis, wherein boundaries of the image sensed by the fisheye lens camera remain the same and the image sensed by the fisheye lens camera rotates during the rotation of the fisheye lens camera;

capturing a first image within the panoramic field of view by using the fisheye lens camera;

identifying a location of an object of interest within the captured first image; and transmitting PTZ commands to the PTZ camera such that the PTZ camera is oriented to capture a second image of the object of interest at the identified location, the PTZ commands being compensated for a rotation of the panoramic field of view of the fisheye lens camera during the rotation of the fisheye lens camera.

2. The method of claim 1, including tilting the PTZ camera about a tilting axis, the tilting causing no change in the boundaries of the image within the panoramic field of view of the fisheye lens camera and causing no rotation of the image in the panoramic field of view of the fisheye lens camera, the panoramic field of view comprising a hemispherical field of view spanning 180 degrees.

3. The method of claim 2, wherein an axis of rotation for the lens of the fisheye lens camera is the same as the panning axis of rotation of the PTZ camera, wherein the orientation of the image received by the lens of the fisheye lens camera rotates during the panning rotation of the PTZ camera.

4. The method of claim 1 wherein the rotating step occurs before and/or during the capturing step, and wherein the panning axis of the PTZ camera intersects the fisheye lens camera.

5. The method of claim 1 comprising further steps of;
performing image processing on the first image, the image processing being compensated for the rotation of the image within the panoramic field of view of the fisheye lens camera during the rotation of the fisheye lens camera, and
displaying the first image on a monitor so that the orientation of the first image is stationary even though the fisheye lens camera is rotating about the panning axis and thus rotating about a central point in the panoramic field of view of the fisheye lens camera, and the physical orientation of the first image received by the fisheye lens camera for image processing is changing with the rotation,
wherein the field of view of the fisheye lens camera is oriented downwardly.

6. The method of claim 1 comprising further steps of:
providing a controller for the PTZ camera within the same housing in which the PTZ camera is disposed, and
providing an autodome for enclosing the PTZ camera and the fisheye lens camera.

7. The method of claim 1 comprising further steps of:
identifying a plurality of areas within the panoramic field of view of the fisheye lens camera, the identified areas having higher motion density than other areas within the panoramic field of view, the area being identified in terms of global coordinate values;
calculating a trajectory of an expected autotour of the PTZ camera in which the PTZ camera captures images of each of the identified areas; and
transmitting PTZ commands to the PTZ camera such that the PTZ camera follows the calculated trajectory in the autotour.

8. The method of claim 7 wherein the trajectory is calculated in terms of global coordinate values, the method comprising the further step of calculating PTZ commands corresponding to the global coordinate values of the calculated trajectory.

9. The method of claim 7 comprising a further step of converting global coordinate values to at least one from the group of pan, tilt and zoom values for the PTZ camera, the trajectory being calculated based on at least one from the group of the pan, tilt and zoom values.

10. A method of processing images captured by an omnidirectional lens of a fisheye lens camera, the method comprising steps of:

detecting motion masks within the field of view and ignoring permanent sources of motion provided behind or within the mask;
identifying a plurality of areas within the field of view of the fisheye lens camera by creating a motion density map of movements of people or objects within the field of view of a sample of the images, the identified areas having higher motion density than other areas within the field of view;
calculating a respective trajectory of an expected autotour function through areas of the motion density map having higher motion density than other areas, wherein at least a portion of the trajectory comprises a linear segment;
calculating a beginning point and an end point of the linear segment such that a sum of distances between the linear segment and the identified areas is minimized;
converting the trajectories to sets of coordinate values; and
converting the coordinate values to pan, tilt, and zoom values for a PTZ camera.

11. The method of claim 10 comprising a further step of executing a plurality of repeatable panning, tilting and/or zooming movements of the PTZ camera based on the pan, tilt, and zoom values.

12. The method of claim 10 comprising further steps of:
calculating a substantially constant autotour speed of the PTZ camera based upon:
a length of the calculated trajectory; and
an allocated length of time of the autotour; and
performing the autotour at the calculated speed.

13. A video surveillance system comprising:
a PTZ camera including a panning axis and a tilting axis, the PTZ camera disposed within a housing;
a fisheye lens camera secured to an outer surface of the housing of the PTZ camera so that the fisheye lens camera is intersected by the panning axis and has a panoramic field of view that is unobstructed by the housing, the panoramic field of view being centered on the panning axis of the PTZ camera;
a processing device communicatively coupled to each of the PTZ camera and the fisheye lens camera; and
a monitor configured to display at least video of the panoramic field of view from the fisheye lens camera,
wherein the fisheye lens camera is configured to simultaneously rotate with the PTZ camera during rotation of the PTZ camera about the panning axis, and
wherein the processing device is configured to compensate so that an orientation of the video of the panoramic field of view sensed by the fisheye lens camera and displayed on the monitor is not changed by the rotation of the fisheye lens camera simultaneously with the PTZ camera, while actual orientation of an image in the panoramic field of view of the fisheye lens camera is constantly changing during the rotation of the fisheye lens camera.

14. The video surveillance system of claim 13, wherein the fisheye lens camera is stationary during tilting of the PTZ camera, and wherein an essentially central viewable point within the image from the panoramic field of view of the fisheye lens camera is in common with the panning axis of the PTZ camera.

15. The video surveillance system of claim 13, wherein the processing device is configured to:
identify a location of an object of interest within a captured first image from the fisheye lens camera; and
transmit PTZ commands to the PTZ camera such that the PTZ camera is oriented to capture a second image of the object of interest at the identified location, the PTZ commands being compensated for a rotation of the field of view of the fisheye lens camera during the rotation of the fisheye lens camera.

16. The system of claim 13, wherein the fisheye lens camera is disposed below the PTZ camera such that the field of view of the fisheye lens is unobstructed by the housing and the field of view is oriented downwardly coaxial with the panning axis.

17. The system of claim 13, wherein the PTZ camera and the fisheye lens camera are configured so that tilting of the PTZ camera causes no change in the boundaries of the image within the panoramic field of view of the fisheye lens camera and the tilting causes no movement of the video of the panoramic field of view of the fisheye lens camera displayed on the monitor.

18. The system of claim 13, wherein an axis of rotation for the fisheye lens camera is the same as the panning axis of rotation of the PTZ camera.

19. The system of claim 13, wherein the PTZ camera is secured to a ceiling within a room, and the fisheye lens camera is secured to a bottom of the housing and aligned vertically downwardly so that the video of the panoramic field of view of the fish lens camera is a floor surface within a room having the ceiling.

20. The system of claim 19, wherein an autodome encloses the housing in which the PTZ camera is disposed and encloses the fisheye lens camera attached to the outer surface of the housing, the autodome allowing images to pass therethrough to the PTZ camera and to the fisheye lens camera.

\* \* \* \* \*